(12) United States Patent
Williams

(10) Patent No.: US 8,943,840 B2
(45) Date of Patent: Feb. 3, 2015

(54) MOUNTING ASSEMBLY

(75) Inventor: Keith Williams, Bristol (GB)

(73) Assignee: Rolls-Royce PLC, London (GB)

( * ) Notice: Subject to any disclaimer, the term of this patent is extended or adjusted under 35 U.S.C. 154(b) by 846 days.

(21) Appl. No.: 13/113,514

(22) Filed: May 23, 2011

(65) Prior Publication Data

US 2011/0296847 A1 Dec. 8, 2011

(30) Foreign Application Priority Data

Jun. 8, 2010 (GB) .................................. 1009548.7

(51) Int. Cl.
*F02C 7/20* (2006.01)
*B21D 53/50* (2006.01)
*F01D 21/04* (2006.01)
*F02C 7/32* (2006.01)

(52) U.S. Cl.
CPC .............. *B21D 53/50* (2013.01); *F01D 21/045* (2013.01); *F02C 7/32* (2013.01); *Y02T 50/671* (2013.01)
USPC ................... 60/796; 60/797; 60/798; 60/799; 60/802

(58) Field of Classification Search
CPC ................ F23R 3/60; F02C 7/20; F02C 7/32; F01D 21/04
USPC .............. 60/796, 797, 798, 799, 802, 39.163
See application file for complete search history.

(56) References Cited

U.S. PATENT DOCUMENTS

| 4,597,258 | A | * | 7/1986 | Harris | 60/796 |
| 5,524,430 | A | * | 6/1996 | Mazeaud et al. | 60/798 |
| 6,170,252 | B1 | * | 1/2001 | Van Duyn | 60/796 |
| 6,895,761 | B2 | * | 5/2005 | Mitchell et al. | 60/796 |
| 2007/0119181 | A1 | * | 5/2007 | Lohmueller et al. | 60/796 |
| 2007/0119182 | A1 | * | 5/2007 | Czachor et al. | 60/796 |
| 2007/0125087 | A1 | | 6/2007 | Callaghan | |
| 2009/0223052 | A1 | * | 9/2009 | Chaudhry et al. | 29/889.2 |

FOREIGN PATENT DOCUMENTS

| EP | 1 010 879 A2 | 6/2000 |
| EP | 1 010 879 B1 | 3/2004 |
| EP | 1 431 664 A2 | 6/2004 |
| EP | 1 775 517 A2 | 4/2007 |
| EP | 2 098 757 A2 | 9/2009 |
| GB | 758206 | 10/1956 |
| GB | 839961 | 6/1960 |

OTHER PUBLICATIONS

Search Report issued in European Application No. 11 16 7134 dated Jun. 6, 2013.
British Search Report dated Sep. 22, 2010 in corresponding British Patent Application No. 1009548.7.

* cited by examiner

*Primary Examiner* — Phutthiwat Wongwian
*Assistant Examiner* — Steven Sutherland
(74) *Attorney, Agent, or Firm* — Oliff PLC

(57) ABSTRACT

A mounting assembly 2 for mounting a gearbox 10 to a gas turbine engine, comprising a mount ring 4 and a spigot pin 8 having a flange 22 at one end. The spigot pin 8 extends radially outwardly through a bore 14 in the mount ring 4 for engagement with a gearbox 10 and the flange 22 locates against a radially inner surface of the mount ring 4. The bore 14 supports the spigot pin 8 and dissipates forces exerted on the spigot pin 8, for example forces generated during a fan blade-off event.

14 Claims, 2 Drawing Sheets

MOUNTING ASSEMBLY

This invention relates to a mounting assembly for a gearbox and is particularly, although not exclusively, concerned with a mounting assembly for mounting an auxiliary gearbox to a gas turbine engine.

In addition to providing thrust or power generation, gas turbine engines typically drive auxiliary devices such as power generators or hydraulic units. A gearbox is therefore often mounted to the external casing of the engine to transmit drive from the engine to the auxiliary devices.

With reference to FIG. 3, a conventional prior art ducted fan gas turbine engine generally indicated at 110 has a principal and rotational axis 111. The engine 110 comprises, in axial flow series, an air intake 112, a propulsive fan 113, and a core engine itself comprising an intermediate pressure compressor 114, a high-pressure compressor 115, combustion equipment 116, a high-pressure turbine 117, and intermediate pressure turbine 118, a low-pressure turbine 119; the engine 110 further comprises an exhaust nozzle 120. A nacelle 121 generally surrounds the engine 110 and defines both the intake 112 and the exhaust nozzle 120.

The gas turbine engine 110 works in a conventional manner so that air entering the intake 112 is accelerated by the fan 113 to produce two air flows: a first air flow into the core engine and on through the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high, intermediate and low-pressure turbines 117, 118, 119 before being exhausted through the nozzle 120 to provide additional propulsive thrust. The high, intermediate and low-pressure turbines 117, 118, 119 respectively drive the high and intermediate pressure compressors 115, 114 and the fan 113 by associated interconnecting shafts 123, 124, 125.

The fan 113 is circumferentially surrounded by a structural member in the form of a fan casing 141, which is supported by an annular array of outlet guide vanes 109 spanning between a casing 139 that surrounds the core engine.

The engine 10 further comprises a gearbox/generator assembly 128 used for engine start up and for generating electricity once the engine has been started and working in convention fashion. The generated electricity is used for engine and associated aircraft electrical accessories as well known in the art. The gearbox/generator assembly 128 is drivingly connected to the high-pressure shaft 124 via drive means 135, however, in other embodiments the gearbox/generator assembly 128 may be driven by any one or more of the shafts 124, 125. In this embodiment, the gearbox/generator assembly 128 comprises an internal gearbox 129 connecting a first drive shaft 130 to the high-pressure shaft 123, an intermediate gearbox 131 connecting the first drive shaft 130 to a second drive shaft 132 and an external gearbox 133 drivingly connected to the second drive shaft 132. The external gearbox 133 is drivingly connected to a generator 134 that is capable of the aforesaid operation. The generator 134 and external gearbox 133 are mounted on the fan casing 141 and housed within the nacelle 121. The first drive shaft 130, intermediate gearbox 131 and the second drive shaft 132 are housed within a bypass duct splitter fairing 140.

Conventionally, the gearbox 133 and driven accessories 136 are arranged circumferentially about the fan casing 141 and generally at the bottom of the engine 110. Other engine accessories 136, as known in the art, are also mounted on the fan casing 141.

Typically the gearbox is suspended below an engine casing or mount ring by a pair of pivoted side links, and held in circumferential and axial alignment by a locator disposed between the two links. An example of such an arrangement is shown in EP1010879.

During normal operation of the engine, the loads acting on the side links and the locator are within acceptable limits. However, a sudden rotor imbalance or a rapid change in inertial forces within the engine can result in large forces being exerted on the gearbox. For example, a blade-off event can result in the generator attempting to back-drive the gearbox thereby generating large inertial forces. These extreme forces can cause failure of the locator which increases the likelihood of damage to the gearbox and so increase the risk of oil spillage and fire.

The locator generally comprises a cylindrical spigot pin which locates in respective recess in the gearbox housing and the casing/mount ring of the engine. The spigot pin has a flange portion midway along its length through which bolts secure the spigot pin to the gearbox.

If the spigot is sized for normal operation, the high stress experienced by the spigot pin in a blade-off event can cause failure of the spigot pin. The stress in the spigot pin can be reduced by increasing its diameter. This increases the bending stiffness of the pin, but results in undesirable flexing of the flange under loading which can lead to failure of the flange or the bolts securing the flange to the engine casing.

Furthermore, increasing the bending strength of the spigot pin increases the force transmitted by the spigot pin to the casing which can result in failure of the casing.

Measures to reduce failure which entail an increase in the weight of the spigot pin and associated features are generally undesirable, particularly in aerospace applications.

According to a first aspect of the invention there is provided a mounting assembly for mounting a gearbox to a gas turbine engine, comprising a mount ring and a spigot pin having a flange at one end, wherein the spigot pin extends radially outwardly through a bore in the mount ring for engagement with a gearbox and the flange locates against a radially inner surface of the mount ring.

The flange may locate in a recess in the radially inner surface of the mount ring.

The spigot pin may be hollow.

The mounting assembly may comprise a resilient spacer ring which surrounds the spigot pin.

The spigot pin may be a press fit within the bore.

The bore may extend through a web of the mount ring, the web being provided with a thickened region surrounding the bore.

The flange may be secured to the mount ring by fasteners.

The mount ring may be provided with links at locations spaced from the spigot pin, for supporting a gearbox against loads applied parallel to the spigot pin and against moments applied about the spigot pin.

According to a second aspect of the invention there is provided an installation comprising a gearbox supported by a mounting assembly according to the first aspect of the invention wherein the spigot pin is slidably received within a recess provided in the gearbox such that the spigot pin is movable within the recess in the axial direction of the spigot pin.

According to a third aspect of the invention there is provided gas turbine engine comprising a mounting assembly according to the first aspect of the invention or an installation according to the second aspect of the invention.

For a better understanding of the present invention, and to show more clearly how it may be carried into effect, reference will now be made, by way of example, to the following drawings of which:

Figure 1:
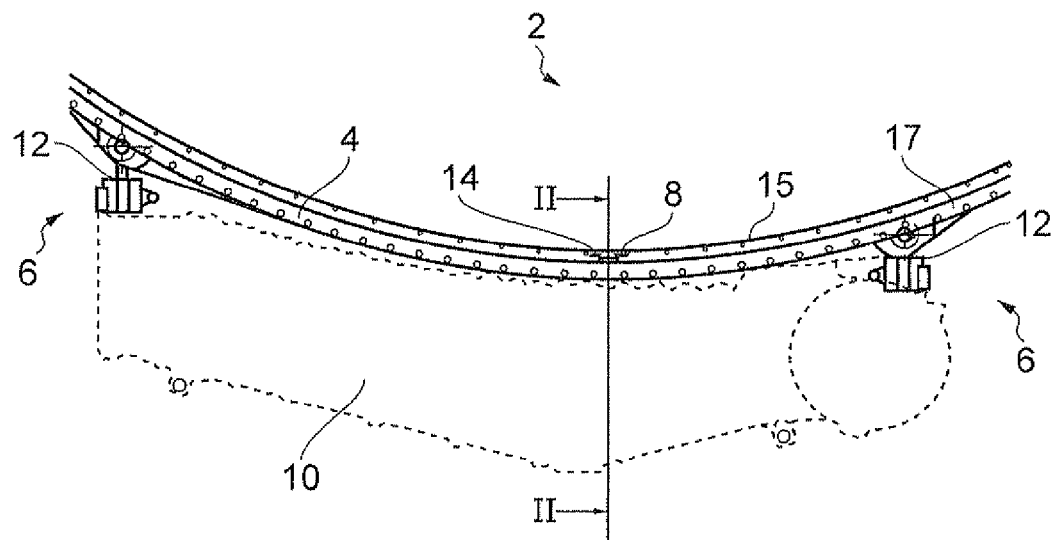
FIG. 1 is a partial perspective view of a gearbox supplied by a mount ring of a gas turbine engine.

FIG. 1 shows a mounting assembly 2 comprising a mount ring 4 (only part of which is shown), a pair of links 6 and a spigot pin 8 supporting a gearbox 10 (shown as a sketched outline). The mount ring 4 is part of, or secured to, an engine casing of a gas turbine engine.

The gearbox 10 is suspended beneath the mount ring 4 by the links 6. Each link 6 comprises a link arm 12 which is pivotally connected to the mount ring 4 at one end of the arm 12 and pivotally connected to the gearbox 10 at the other end of the arm 12. The links 6 are spaced apart from each other about the mount ring 4 in a circumferential direction. The rotational axes of the pivots are perpendicular to each other. The gearbox 10 thus has a limited range of movement in roll and pitch about the respective pivots.

A bore 14 is provided through the mount ring 4 in a radial direction. The bore 14 is approximately midway between the links 6 and is positioned such that it is at the bottom of the mount ring 4 in the normal installed position of the engine.

Figure 2:
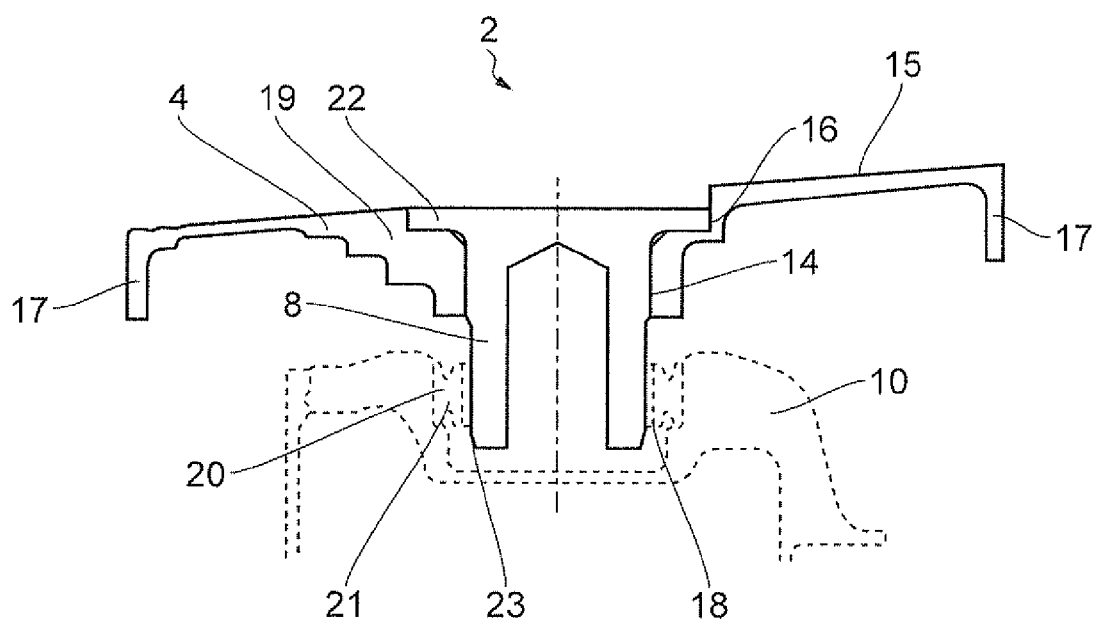
FIG. 2 is a sectional view taken along line II-II in FIG. 1.
Figure 3:
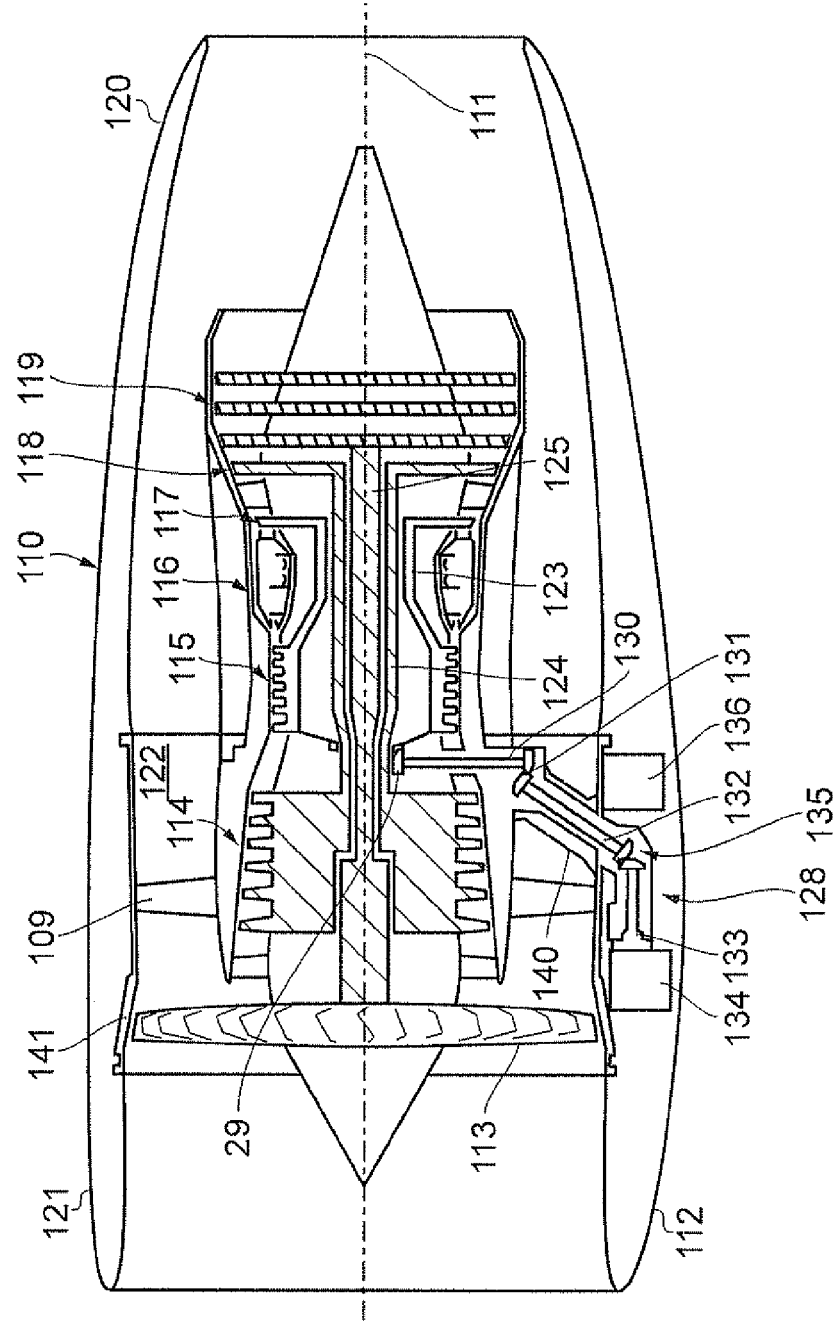
FIG. 3 shows a schematic longitudinal cross-section through a ducted fan gas turbine engine.

As shown in FIG. 2, the mount ring 4 has a substantially channel-shaped cross-section comprising a generally axially extending web 15 and oppositely disposed flanges 17. A thickened region of the web 15 surrounds the bore 14, forming a reinforcing boss 19. A recess 16 is provided in the radially inner surface of the mount ring 4 about the periphery of the bore 14.

The gearbox 10 has a locating recess 18 which aligns with the bore 14. An annular spacer 20 is disposed within the locating recess 18. The inner diameter of the annular spacer 20 is approximately equal to the diameter of the bore 14. As shown in FIG. 2, the annular spacer 20 comprises a resilient ring 21 provided with an inner bearing liner 23.

The spigot pin 8 comprises a hollow cylinder having a flange 22 at one end. The spigot pin 8 is closed at the end adjacent the flange 22 and open at the end opposite the flange 22. The spigot pin 8 extends along the bore 14 and through the annular spacer 20. The spigot pin 8 has a larger diameter region adjacent the flange 22, which is a light press fit in the bore 14. A smaller diameter region of the spigot pin 8 extends into the spacer 20. The spigot pin 8 is installed by inserting it into the bore 14 from the inside of the mount ring 4. The flange 22 locates within the recess 16 in the mount ring 4 and is secured to the mount ring 4, for example by bolts passing through holes (not shown) provided in the flange 22. The end of the spigot pin 8 opposite the flange 22 is spaced away from the bottom of the locating recess 18. The spigot pin 8 can slide and rotate freely within the liner 23 of the annular spacer 20.

Vertical loads on the gearbox 10 are transferred to the mount ring 4 by the links 6. The links 6 also transmit moments generated about the axis of the spigot pin 8 to the mount ring 4.

The axial and circumferential loads, with respect to the axis of the mount ring 4, are transferred through the annular spacer 20 and the spigot pin 8 to the mount ring 4, so that, together, the links 6 and the spigot pin 8 provide full constraint of the gearbox 10 with respect to the mount ring 4. The bore 14 supports the spigot pin 8 and dissipates the force acting on the spigot pin 8 through the wall of the bore 14 thus reducing the resultant bending moment acting on the spigot pin 8 and flange 22. The support provided by the bore 14 enables an increased diameter spigot pin 8 to be used to reduce the stress in the mount ring 4 without creating undue flexing of the flange 22 under loading, of the spigot pin 8. The length of the bore 14 can be increased to provide greater support for the spigot pin 8.

Thus, during severe distortion of the engine casing and consequently of the mount ring 4, for example during a fan blade-off event, the resulting loads are dissipated efficiently. This leads to lower stresses in the mount ring web 15, so that the likelihood of failure of the web 15 is reduced. The spigot pin 8 and its attachment to the mount ring 4 is thus more likely to survive a fan blade-off event.

Because the spigot pin 8 is a light press fit in the bore 14, overstressing of the mount ring 4 during installation of the spigot pin 8 or during normal operation is avoided. The flange 22 is supported in the recess 16 in the inside surface of the mount ring 4. This configuration, along with the support of the spigot pin 8 by the bore 14, reduces bending forces applied to the flange 22. Consequently, it is possible to employ fewer and smaller diameter fasteners to secure the flange 22 to the mount ring 4, leading to reduced weight and reduced installation time.

The invention claimed is:

1. An installation having a gearbox supported by a mounting assembly having a mount ring and a spigot pin having a flange at one end, wherein the gearbox is suspended beneath the mount ring by two or more links, each link comprising a link arm that is connected to the mount ring at one end of the arm and connected to the gearbox at the other end of the arm, the spigot pin extending radially outwardly through a bore in the mount ring to engage with the gearbox and the flange locates against a radially inner surface of the mount ring.

2. An installation according to claim 1, wherein the spigot pin is slidably received within a recess provided in the gearbox such that the spigot pin is movable within the recess in the axial direction of the spigot pin.

3. A mounting assembly mounting a gearbox to a gas turbine engine, the mounting assembly having a mount ring and a spigot pin having a flange at one end, wherein the gearbox is suspended beneath the mount ring by two or more links, each link comprising a link arm that is connected to the mount ring at one end of the arm and connected to the gearbox at the other end of the arm, the spigot pin extending radially outwardly through a bore in the mount ring to engage with the gearbox, and the flange locating against a radially inner surface of the mount ring.

4. A mounting assembly according to claim 3, wherein the flange locates in a recess in the radially inner surface of the mount ring.

5. A mounting assembly according to claim 4, wherein the spigot pin is a press fit within the bore.

6. A mounting assembly as claimed in claim 5, wherein the bore extends through a web of the mount ring, the web being provided with a thickened region surrounding the bore.

7. A gas turbine engine having a mounting assembly as claimed in claim 5, wherein rotational axes of the pivots are perpendicular to each other such that the gearbox has a limited range of movement in roll and pitch about the respective pivots.

8. A mounting assembly according to claim 3, wherein the spigot pin is hollow.

9. A mounting assembly according to claim 3, wherein a resilient spacer ring surrounds the spigot pin.

10. A mounting assembly according to claim 3, wherein the spigot pin is a press fit within the bore.

11. A mounting assembly as claimed in claim 3, wherein the bore extends through a web of the mount ring, the web being provided with a thickened region surrounding the bore.

12. A mounting assembly according to claim 3, wherein the flange is secured to the mount ring.

13. A mounting assembly as claimed in claim 3, wherein the mount ring is provided with links at locations spaced from the spigot pin, supporting the gearbox against loads applied parallel to the spigot pin and against moments applied about the spigot pin.

14. A mounting assembly as claimed in claim 3, wherein each link comprises a link arm that is pivotally connected to the mount ring at one end of the arm and pivotally connected to the gearbox at an other end of the arm.

* * * * *